Figure 1:
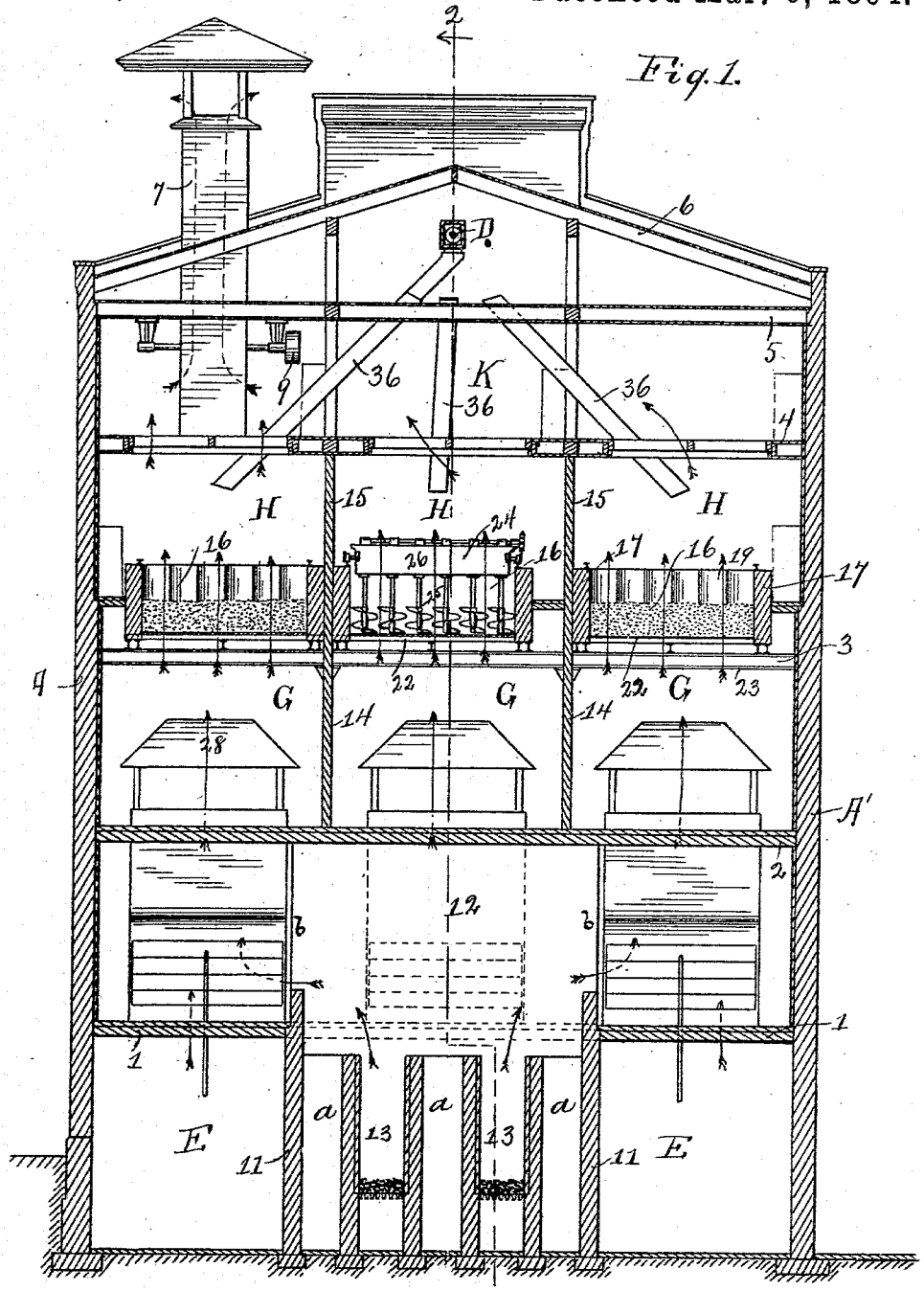

(No Model.) 2 Sheets—Sheet 1.

W. H. PRINZ.
MALT KILN AND METHOD OF DRYING MALT.

No. 515,840. Patented Mar. 6, 1894.

Witnesses:
Rudolph W. Lotz
Arthur C. Lotz

Inventor:
William H. Prinz
By Lotz & Kennedy
Attorneys

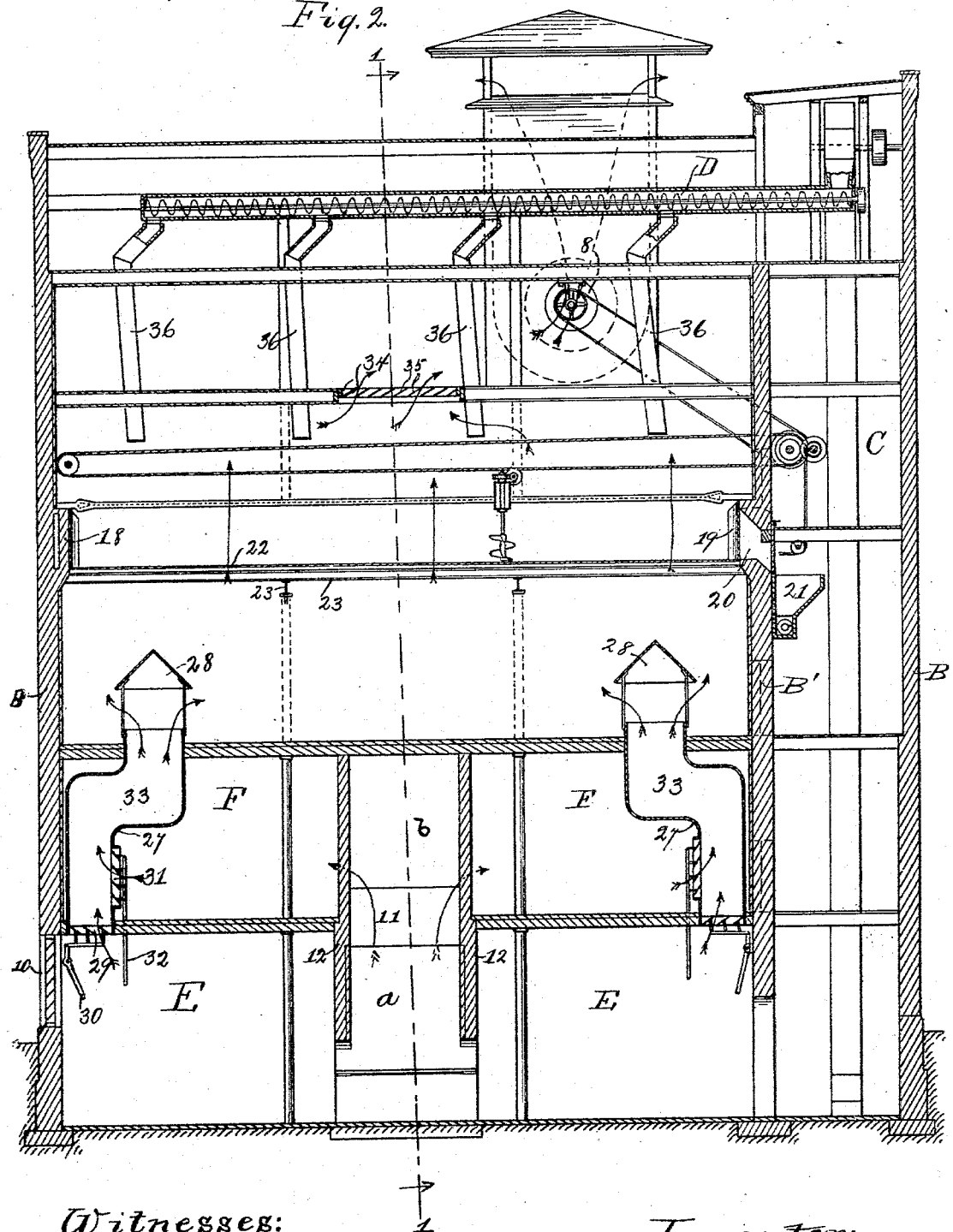

UNITED STATES PATENT OFFICE.

WILLIAM H. PRINZ, OF CHICAGO, ILLINOIS, ASSIGNOR TO THE SALADIN PNEUMATIC MALTING CONSTRUCTION COMPANY, OF SAME PLACE.

MALT-KILN AND METHOD OF DRYING MALT.

SPECIFICATION forming part of Letters Patent No. 515,840, dated March 6, 1894.

Application filed March 28, 1893. Serial No. 468,063. (No model.)

*To all whom it may concern:*

Be it known that I, WILLIAM H. PRINZ, a citizen of the United States, residing at Chicago, in the county of Cook and State of Illinois, have invented certain new and useful Improvements in Malt-Kilns and Methods for Drying Malt; and I do hereby declare the following to be a full, clear, and exact description of the invention, such as will enable others skilled in the art to which it appertains to make and use the same.

This invention relates to a novel construction in a malt kiln and in the novel method for drying malt, the object being to provide a malt kiln and method for drying malt whereby a higher and better grade of malt can be uniformly produced.

In the drying of malt, to accomplish the best results it is found desirable to sweat the grain, that is, to place it in a heap so that the heat generated by the grain itself will cause the same to sweat, or, in other words, to drive the moisture out of the kernel which in this sweating operation occurs first in the center of the kernel and gradually outward. I find that the malt is dried in an efficient manner by thus causing it to sweat because the pores in the hull or husk of the grain are kept open, so that the moisture can more readily evaporate. I make the distinction between drying the grain by thus sweating it, which is done at intervals, and the usual way of turning the malt so as to allow it to ventilate and thus dry, in that by the latter method the moisture near the hull or husk of the kernel is dried out first and this has to a certain extent the effect of closing up the pores in the hull or husk of the kernel which manifestly tends to retard the evaporation of the moisture near the center of the kernel which not only must pass through the closed or partially closed pores of the kernel, but must also pass through the dried portion of the kernel, and it will thus be seen that the outer portion of the kernel must first be dried out and then moistened again by the evaporation or passing therethrough of the moisture from the center of the kernel. In my method, however, by sweating the malt the drying occurs first at the center and this drives out the moisture on the outside so that the portion of the grain once dried is not moistened again.

I have found it desirable in drying malt by my method to cause the same to sweat at intervals and alternately ventilate and turn the malt. This has the effect of evaporating the moisture first driven from the kernel and also to prevent the formation of mold.

The advantages which I claim for this novel method of drying malt are that by the sweating, ventilation and turning, the malt is uniformly and quickly dried and that it produces a paler malt, which is not only a higher grade and sells at a better price, but is mellower and has a better flavor which I claim is the result of the thorough and uniform operation of the moisture held in the malt.

In the accompanying drawings I have shown one form of apparatus by which my novel method can be practiced, and illustrating my invention in a malt kiln, and my invention consists in the steps of such method and in the features of construction and combination of parts hereinafter fully described and specifically claimed.

In said drawings,—Figure 1 is a vertical cross section of a malt kiln constructed in accordance with my invention, taken on the line 1—1 of Fig. 2. Fig. 2 is a vertical longitudinal section of the same taken on the line 2—2 of Fig. 1.

Referring now to said drawings, A, A' indicate the side walls of a malt kiln, and B, B' the end walls thereof. At one end of the kiln is the elevator C for carrying the malt to the top of the kiln and dumping it into a conveyer D by which it is distributed.

In accordance with the principle involved in my invention I divide the said malt kiln into five principal chambers or compartments by floors, namely,—the cold air chambers E formed between the ground floor of the building and the first floor 1; the hot air chamber F formed between the first floor 1 and the second floor 2; the sprout chambers G formed between the second floor 2 and the third floor 3; the compartment or drying chambers H formed between the third floor 3 and the fourth floor 4, and the fan chamber K formed between the fourth floor 4 and the fifth floor 5. Between the fifth floor 5 and the roof 6 of the kiln the conveyer D is located. A ventilator 7 leads from the fan chamber K through the roof of the building and near the bottom of said ventilator is a fan to exhaust air from said fan chamber through an opening 8 in the ventilator shaft, which fan is operated by means of a pulley 9 and suitable gearing. The cold air chamber E communicates with the outside air through a suitable opening 10. Located about in the middle of the building between walls 11 and 12 and extending between the ground and first floors thereof are the furnaces 13 for supplying hot air said furnaces being located between uprights walls $a$ extending between the walls 12 and parallel with the walls 11. The said walls 11, or the side walls of said furnace, extend only a little distance above the first floor 1 thus leaving openings $b$ between their upper ends and the second floor 2 so as to establish communication between the furnaces and the hot air chamber F between the first and second floors, while the end walls 12 of the furnaces extend to the second floor 2.

In accordance with the principle involved by my invention the space between the second and third floors and the third and fourth floors is divided up into separate chambers, for instance, between the second and third floors are the upright walls 14 running the entire length of the building and thus dividing it into three sprout chambers G, while between the third and fourth floors are upright walls 15 running the entire length of the building and dividing the space between these floors into three compartments or drying chambers H that are located above the sprout chambers G.

The malt is dried within compartments 16, one of which is located in each chamber H, and preferably consist of the side walls 17, end wall 18 and removable end plates 19. These removable end plates 19 are located adjacent to the elevator C, and through the end wall B′ of the building, in the rear of plates 19, is an opening or passage 20 through which the dried malt can be removed from the compartment and emptied into a conveyer 21 below said opening or passage 20. The said compartments are provided with perforated bottoms 22 extending the entire length of the same, and the entire compartment is supported upon the floor beams 23 of the third floor 3. Supported upon the walls 17 of the compartments is a suitable malt turning device indicated as a whole by 24, and in the instance illustrated consisting of a plurality of spiral turning screws 25 held by a frame 26 upon which said screws rotate, while said frame is movable up and down the compartment upon the walls 17 thereof by the employment of suitable gearing. In this way it will be seen that malt placed in these compartments can be turned at pleasure by the use of these turning devices 24.

It will be noted that the building is divided into a plurality of compartment chambers and a plurality of sprout chambers, and I provide means whereby hot and cold air, or mixed hot and cold air, can be supplied to each of these chambers.

Leading from the cold air chamber E and located at opposite ends of the building are the ducts or passages 27 that pass upwardly through the hot air chamber F and communicate at their upper ends with the sprout chambers G. A plurality of these ducts 27 are employed at each end of the building corresponding with the number of sprout chambers, so that into each sprout chamber the upper ends of the two ducts 27 enter near the opposite ends of these sprout chambers, and said ducts are provided at their upper ends within said sprout chambers with caps or hoods 28 to prevent the entrance of sprouts therein. The lower end of the ducts 27 are provided with valves 29 to control the supply of cold air thereto and these valves are controlled by levers 30. Within the hot air chamber each of said ducts is provided with valves 31 to control the supply of hot air and these valves are controlled by rods 32.

As a further and separate improvement in these hot and cold air ducts I provide therein what I term a mixing chamber 33 which consists in making a deflection or obstruction in said ducts and enlarging the same at and above such deflection or obstruction. In this way it will be noted that the separate currents of hot and cold air that may enter therein are thrown out of the regular course they would separately take into a larger chamber where they are mixed, as will be obvious, and will then enter the sprout chamber in such mixed state.

From the foregoing description it will be seen that each of the sprout chambers and compartment or drying chambers can be supplied with hot, cold, or mixed hot and cold air, by reason of the perforated bottom of the compartments and that said supply of air and the temperature thereof can be controlled by the valves 29 and 31 of said ducts, and further by locating the upper end of a duct at each end portion of the sprout chamber, that the supply of air thereto will be uniform.

For creating a current I employ the exhaust fan hereinafter referred to and located within a ventilating shaft 7 communicating with the fan chamber K, and in the floor 4 of this fan chamber and over each compartment or drying chamber H a valve 34 is located provided with devices 35 for controlling the same. By reason of said valves 34 the current through the compartment or drying chambers can be effectually regulated to suit the conditions of the malt being treated.

Leading from the conveyer D at the upper end of the kiln are the spouts 36 with their lower ends located above the different compartments and disposed throughout the length of the compartments to distribute malt along the length of the same.

The manner in which malt is dried in a kiln of this construction is as follows: For the purpose of illustration we will suppose that only one compartment 16 is filled with grain, although it will be understood that one or more compartments can be separately operated and that the entire number of compartments can be in operation at the same time.

In drying malt the malt is first withered, that is, it is first dried to a certain extent by cool air until about seventy-five per cent. of the moisture is driven out, and then warmer air is employed. The malt is subjected to the withering stage of the drying to more perfectly discharge and dissolve the starch it contains and to make a uniform and plumper article. To accomplish the withering, the valves 29 and 31 between the ducts 27 and the cold and hot air chambers are manipulated to supply air of the desired temperature, and the exhaust fan is operated to cause a current through the kiln. It will, of course, be noted that the temperature of the air for withering the malt can always be nicely regulated and made the same by reason of the hot and cold air supply, so that in cold weather the temperature of the cold air can be raised to the desired extent. After the malt is withered, the valves controlling the hot and cold air currents are so manipulated that the temperature of the air passing through the malt is gradually raised and the malt is thoroughly dried. It will be understood of course that with my kiln, malt can be dried by the method heretofore employed with great efficiency, but I will now describe the operation of my malt kiln with particular reference to my said novel method, which applies to the first stage or withering of the malt, as well as the last stage or final drying. In accordance with such method the malt is intermittently ventilated so that between such periods of ventilation the malt can sweat. To attain this end in connection with my apparatus I control the currents of air to the sprout chamber G and compartment chamber H by the valves before referred to, so that when it is desired to allow the malt to sweat such valves can be closed, and thus shut off the current of air. It is further obvious that in drying the malt the best results can be obtained by gradually increasing the temperature as the drying progresses, and this can also be accomplished by the valves controlling the hot and cold air currents, and as before referred to, the malt is turned or agitated between the periods of ventilation which, as will be seen, can be accomplished by the turning devices 24 upon each compartment. From the foregoing description it will be apparent that all the conditions for sweating and turning and supplying to the malt the current of air in the desired quantity and temperature, can be secured by the employment of the devices I provide. In carrying out this method the temperature of the air used at the different stages of the drying, the duration and frequency of the ventilation and sweating periods, and the several steps of the method, will of course vary according to the quality and condition of the malt, and other conditions, so that the exact temperatures and duration of the different steps cannot be stated, but the method can be carried out in the following manner: The green malt is first run into the compartment until it stands about twenty-four inches deep, or deeper if necessary. The screws are then run the length of the compartment to loosen up the malt. Cool air is forced through the malt at a temperature of about 80° or 90° Fahrenheit. This operation is kept up from eight to twelve hours or until about seventy-five per cent. of the moisture is removed. That is to say, air at this temperature is forced through from eight to twelve hours, but not continuously, for every third hour the current of air is stopped and this has the effect of sweating the malt, for by the heat generated by the malt, it will start to sweat in an obvious manner. After the grain is allowed to sweat for one hour, it is turned or agitated and then allowed to sweat a little more before the ventilation continues. This ventilating with cool air and intermittent sweating, is what is termed withering the malt. At this point the temperature of the air current is gradually raised, so that at the end of ten or fifteen hours after the withering is completed the temperature of the air will be about 125°. During all this time the intermittent ventilation as we term it, and sweating is continued, but in this period of ten to fifteen hours after the withering, the ventilation continues for four hours, while it is allowed to sweat one hour. After it sweats for one hour, it is turned by the agitating devices and at this stage only about ten per cent. of the moisture remains. At this stage the temperature is raised at once to about 160° or 200°, and kept at this temperature for from six to nine hours, or until the malt is dried as completely as can be, which leaves from one to two per cent. of moisture in the grain, and during this last period the ventilation continues for six hours with one hour of sweating and turning. Cool air is then forced through the malt for one hour at about 100° temperature to cool it off, so that it may be stored without browning, which it would do in a heated condition.

As a further and separate improvement in a malt kiln I claim the separation of the sprout chamber from the furnaces, for by interposing a hot air chamber between the sprout chamber and the furnace I am enabled not only to regulate the hot air currents and mix the same with cold air, but cut off the direct communication from the furnace to prevent the entrance of ashes, &c., into the sprout chamber or in contact with the malt, and I claim also especially a malt kiln constructed whereby the supply of hot or cold air currents can be attained either separately or mixed.

I claim as my invention—

1. The herein-described method for drying malt which consists in alternately sweating and ventilating the same, substantially as described.

2. The herein-described method for drying malt which consists in alternately sweating ventilating and turning or agitating the same, substantially as described.

3. The herein-described method for drying malt which consists in sweating the kernel to drive the moisture toward the outside and in evaporating such moisture as it is driven out by such sweating, substantially as described.

4. In a malt kiln, a compartment or drying chamber, a sprout chamber communicating therewith, a duct leading from a cold air chamber to said sprout chamber, a valve controlling the supply of air from said cold air chamber to said duct, a hot air chamber communicating with said duct, a valve controlling the supply of air from said hot air chamber to said duct, and a passage for leading the air from said compartment or drying chamber, substantially as described.

5. In a malt kiln having a compartment or drying chamber, a duct communicating with said compartment or drying chamber and with a cold and hot air supply, an enlargement between the ends of said duct forming a mixing chamber in said duct, and a passage for leading the air from said compartment or drying chamber, substantially as described.

6. In a malt kiln having a compartment or drying chamber and a sprout chamber communicating therewith, of a duct communicating with said sprout chamber and with a cold and hot air supply, said duct having an obstruction or deflection above the point where it receives the hot and cold air supply and being enlarged at and above said obstruction or deflection, and a passage for leading the air from said compartment or drying chamber, substantially as described.

7. In a malt kiln, a plurality of separate compartments or drying chambers, a plurality of separate sprout chambers, a hot air chamber communicating with ducts leading to said separate sprout chambers, valves controlling the communication between said hot air chamber and ducts, a source for supplying hot air communicating with said hot air chamber, a cold air chamber communicating with said ducts, valves controlling the communication between said cold air chamber and said ducts, and a fan or exhaust chamber communicating with said compartment or drying chamber, substantially as described.

In testimony whereof I affix my signature in presence of two witnesses.

WILLIAM H. PRINZ.

Witnesses:
RUDOLPH W. LOTZ,
E. J. BOILEAU.